US008873109B2

(12) United States Patent
Ooyanagi

(10) Patent No.: US 8,873,109 B2
(45) Date of Patent: Oct. 28, 2014

(54) PRINTING APPARATUS AND METHOD FOR COMBINING A DOCUMENT IMAGE WITH A COPY-FORGERY-INHIBITED PATTERN IMAGE

(75) Inventor: Maho Ooyanagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 483 days.

(21) Appl. No.: 13/337,590

(22) Filed: Dec. 27, 2011

(65) Prior Publication Data

US 2012/0170080 A1 Jul. 5, 2012

(30) Foreign Application Priority Data

Jan. 5, 2011 (JP) ................................. 2011-000591

(51) Int. Cl.
| | | |
|---|---|---|
| *H04N 1/40* | (2006.01) | |
| *G06K 15/02* | (2006.01) | |
| *G06K 15/00* | (2006.01) | |
| *H04N 1/00* | (2006.01) | |
| *G03G 21/04* | (2006.01) | |

(52) U.S. Cl.
CPC .......... *H04N 1/00875* (2013.01); *G06K 15/189* (2013.01); *G06K 15/4095* (2013.01); *H04N 1/00883* (2013.01); *G03G 21/043* (2013.01); *H04N 1/00846* (2013.01)
USPC .......... 358/3.28; 358/1.9; 358/3.06; 358/450; 358/540

(58) Field of Classification Search
None
See application file for complete search history.

(56) References Cited

U.S. PATENT DOCUMENTS

| | | | | |
|---|---|---|---|---|
| 6,493,457 | B1* | 12/2002 | Quackenbush et al. ........ | 382/100 |
| 7,168,868 | B2* | 1/2007 | Uchida et al. ................... | 400/62 |
| 7,999,973 | B2* | 8/2011 | Nakata et al. ................ | 358/3.28 |
| 8,189,212 | B2* | 5/2012 | Uchida et al. ................ | 358/1.13 |
| 8,553,291 | B2* | 10/2013 | Murakami .................... | 358/300 |
| 8,659,792 | B2* | 2/2014 | Aritomi et al. ................ | 358/1.9 |
| 8,712,094 | B2* | 4/2014 | Anan et al. .................... | 382/100 |
| 2005/0219634 | A1* | 10/2005 | Murakami ................... | 358/3.28 |
| 2007/0091352 | A1* | 4/2007 | Nakata et al. ................ | 358/1.14 |
| 2011/0141501 | A1* | 6/2011 | Shirata .......................... | 358/1.9 |
| 2011/0176177 | A1* | 7/2011 | Uchida et al. ............... | 358/3.28 |

FOREIGN PATENT DOCUMENTS

| | | |
|---|---|---|
| JP | 4-221981 A | 8/1992 |
| JP | 2001-197297 A | 7/2001 |

* cited by examiner

*Primary Examiner* — Dung Tran
(74) *Attorney, Agent, or Firm* — Canon U.S.A., Inc. IP Division

(57) ABSTRACT

A printing apparatus for combining a document image with a copy-forgery-inhibited pattern image to perform printing includes a unit configured to determine a video count value from the document image, a unit configured to determine a video count value from the copy-forgery-inhibited pattern image, and a unit configured to multiply the video count value determined from the document image by a rate of dots other than dots constituting the copy-forgery-inhibited pattern image in the document image to obtain a product, and to add, to the product, the video count value determined from the copy-forgery-inhibited pattern image to determine a video count value for the printing.

4 Claims, 8 Drawing Sheets

FIG. 6
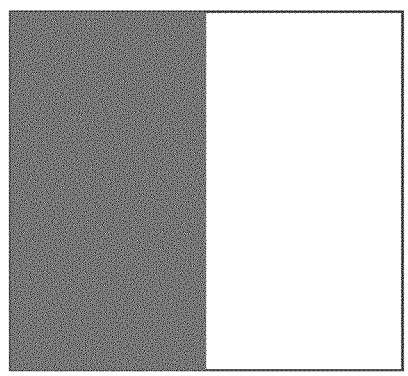
601
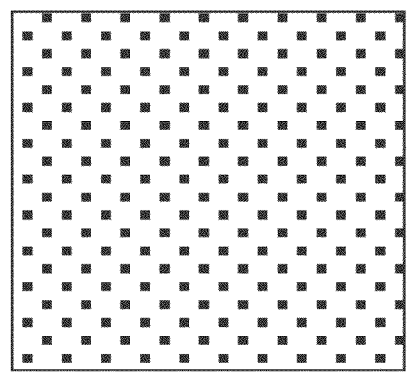
602
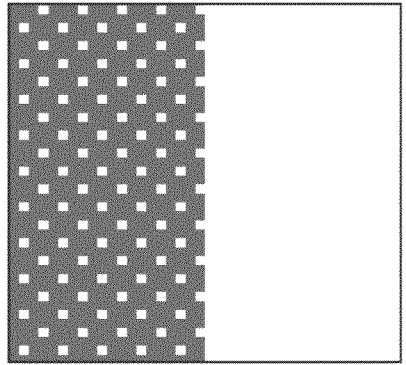
603
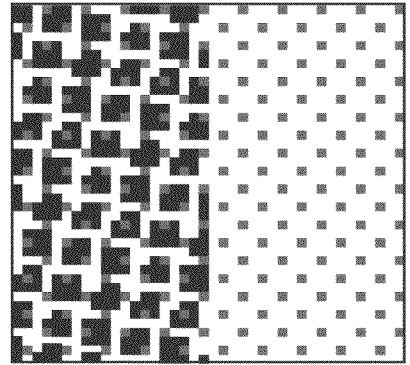
604

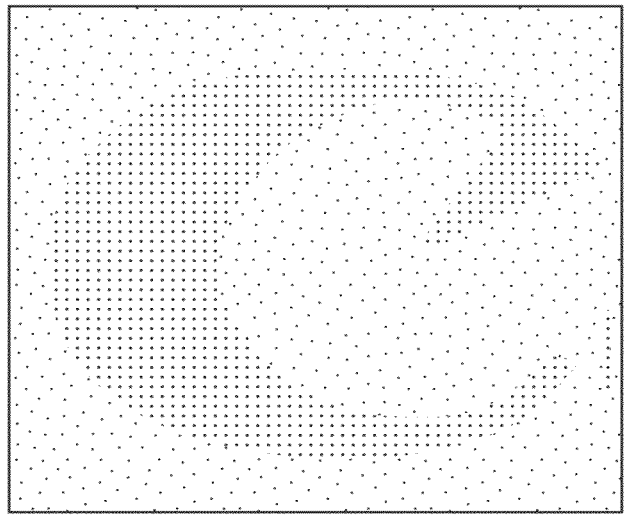
FIG. 8A
PRIOR ART
VISUALIZATION
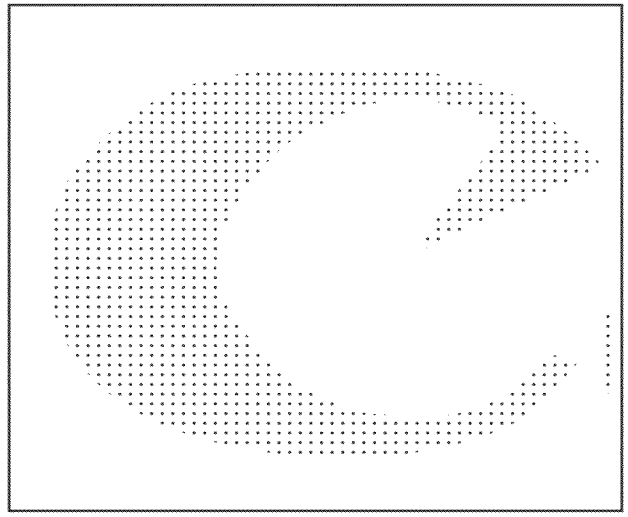
FIG. 8B
PRIOR ART

PRINTING APPARATUS AND METHOD FOR COMBINING A DOCUMENT IMAGE WITH A COPY-FORGERY-INHIBITED PATTERN IMAGE

BACKGROUND OF THE INVENTION

1. Field of the Invention

The present invention relates to a printing apparatus which determines a video count value when a document image is combined with a copy-forgery-inhibited pattern image, a method of controlling the same, and a storage medium.

2. Description of the Related Art

In general, a developer density control device of an image forming apparatus adds up video count numbers of document image data to estimate the consumption of a developer for replenishment (for example, see Japanese Patent Application Laid-Open No. 04-221981). In order to generate image data that can produce effects similar to those of a forgery-inhibited sheet, there has recently been a technology of combining document image data with copy-forgery-inhibited pattern image data to generate print image data (for example, see Japanese Patent Application Laid-Open No. 2001-197297). In the case of combining document image data with copy-forgery-inhibited pattern image data, the developer consumption has conventionally been estimated for replenishment without adding up the combined video count numbers.

Copy-forgery-inhibited pattern image data includes regions to "remain" on a copy product and regions to "disappear" or become thinner than the regions to "remain". The two types of regions have generally the same reflection densities on the original. This makes any embedded character string such as "COPY" less visible to the human eye. As employed herein, to "remain" means that an image on an original is reproduced on a copy product. To "disappear" means that an image on an original is thinly reproduced, or not reproduced, on a copy product.

Hereinafter, regions to "remain" on a copy product will be referred to as "latent image portions." Regions to "disappear" or become thinner than regions to "remain" will be referred to as "background portions."

FIG. 7 is a diagram illustrating a state of dots in copy-forgery-inhibited pattern image data. The region where dots are concentrated is a latent image portion. The region where dots are dispersed is a background portion. In the two regions, dots are generated by respective different types of halftone dot processing and/or different types of dither processing. For example, the dots in the latent image portion are generated by halftone dot processing with a low screen ruling. The dots in the background portion are generated by halftone dot processing with a high screen ruling. Alternatively, the dots in the latent image portion may be generated by using a dot-concentrated-type dither matrix. The dots in the background portion may be generated by using a dot-dispersed-type dither matrix.

A copying machine's reproduction capability depends on the input resolution and output resolution of the copying machine. There is, therefore, a limit to the copying machine's reproduction capability. Suppose that dots in a latent image portion of copy-forgery-inhibited pattern image data are formed to be larger than reproducible dots of a copying machine, and dots in a background portion are formed to be smaller than the reproducible dots. In such a case, the dots in the latent image portion are typically reproduced while those in the background portion are less likely to be. As a result, the latent image portion is reproduced thicker than the background portion on a copy product. Hereinafter, the phenomenon that latent image portions are reproduced thicker than background portions on a copy product so that an embedded character string or the like appears to be visible will be referred to as visualization.

FIGS. 8A and 8B are diagrams illustrating the visualization. The diagrams conceptually illustrate that concentrated dots (large dots) are reproduced on a copy product while dispersed dots (small dots) are not accurately reproduced on the copy product.

Copy-forgery-inhibited pattern image data is not limited to the foregoing configuration. Copy-forgery-inhibited pattern image data may have any configuration as long as a character string such as "COPY" or a symbol or pattern appears (is visualized) on a copy product so as to be recognizable to humans. A character string like "COPY" may be shown in outline on a copy product, and such copy-forgery-inhibited pattern image data is also applicable. In such a case, the regions of "COPY" will be referred to as background portions.

A copy-forgery-inhibited pattern is composed of background portions and latent image portions. It is important that the two types of regions be rendered in generally the same reflection densities on an original.

According to the conventional technology, outputting image data in which document image data and copy-forgery-inhibited pattern image data are combined inevitably causes small errors between the developer's consumption system and replenishment system. Such small errors can be accumulated to gradually change the mixing ratio of a developer, i.e., toner and a carrier. This makes image output with an optimum density impossible.

SUMMARY OF THE INVENTION

An aspect of the present invention is directed to a printing apparatus capable of easily calculating a video count number of image data in which document image data and copy-forgery-inhibited pattern image data are combined.

According to an exemplary embodiment of the present invention, a printing apparatus for combining a document image with a copy-forgery-inhibited pattern image to perform printing includes a unit configured to determine a video count value from the document image, a unit configured to determine a video count value from the copy-forgery-inhibited pattern image, and a unit configured to multiply the video count value determined from the document image by a rate of dots other than dots constituting the copy-forgery-inhibited pattern image in the document image to obtain a product, and to add, to the product, the video count value determined from the copy-forgery-inhibited pattern image to determine a video count value for the printing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a conceptual diagram of the processing of calculating a video count value after the combination of document image data and copy-forgery-inhibited pattern image data according to the exemplary embodiment of the present invention.

FIGS. 8A and 8B are diagrams illustrating visualization.

DESCRIPTION OF THE EMBODIMENTS

Various exemplary embodiments, features, and aspects of the invention will be described in detail below with reference to the drawings.

In an exemplary embodiment of the present invention, an arbitrary content image and a copy-forgery-inhibited pattern image are combined to output an original (original print product). The following description deals with a copy product in which background portions become thinner than latent image portions so that a latent image character string and/or latent image symbols appear to be visible. However, the copy-forgery-inhibited pattern image according to an exemplary embodiment of the present invention is not limited thereto. For example, as mentioned previously, a latent image character string and/or latent image symbols may be configured as background portions, and regions around the background portions as latent image portions. In such a case, the latent image character string and/or latent image symbols are expressed in outline on a copy product.

Figure 1:
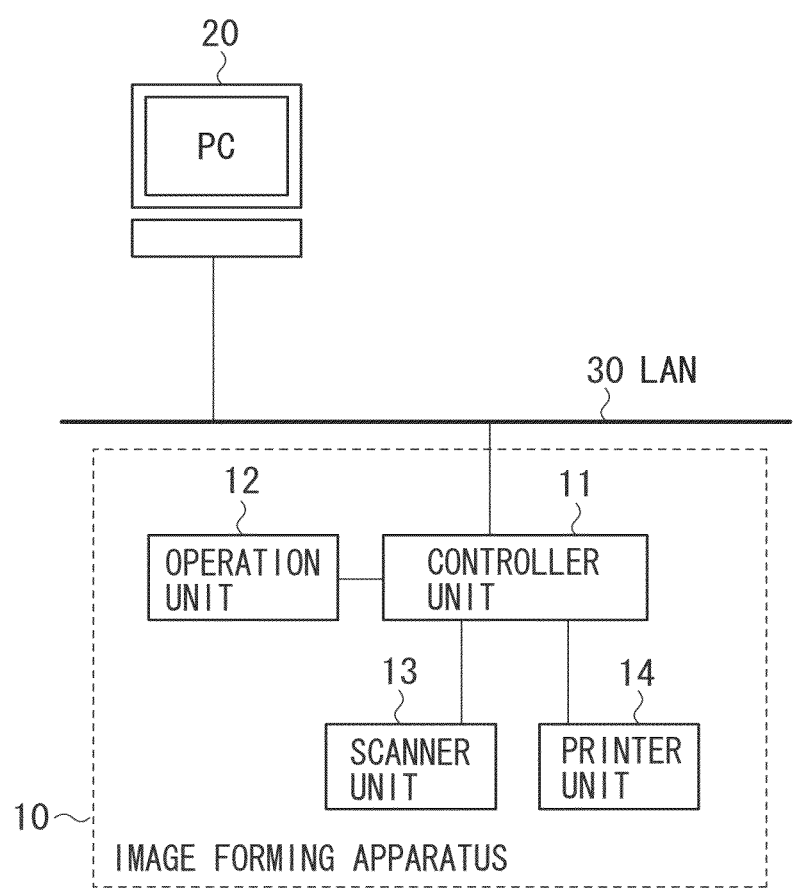
FIG. 1 is a diagram illustrating the overall configuration of a printing system according to an exemplary embodiment of the present invention.

FIG. 1 is a block diagram illustrating the configuration of a printing system according to an exemplary embodiment of the present invention.

The printing system includes a host computer 20 and an image forming apparatus 10, which are connected to a local area network (LAN) 30. The number of apparatuses connected in the printing system according to an exemplary embodiment of the present invention is not limited thereto. While the present exemplary embodiment uses a LAN to connect the apparatuses, the mode of connection is not limited thereto. For example, arbitrary networks such as a wide area network (WAN) and a public telephone line, serial transmission schemes such as universal serial bus (USB), and parallel transmission schemes such as Centronics and small computer system interface (SCSI) may are also applicable.

The host computer (hereinafter, referred to as PC) 20 has the functions of a personal computer. The PC 20 can transmit and receive files and electronic mail via the LAN 30 and/or a WAN by using File Transfer Protocol (FTP) and/or Server Message Block (SMB) protocol. The PC 20 can also issue a print command to the image forming apparatus 10 via a printer driver.

The image forming apparatus 10 includes a controller unit 11, an operation unit 12, a scanner unit 13 of an image input device, and a printer unit 14 of an image output device. The controller unit 11 controls the operation of the entire image forming apparatus 10. The operation unit 12 is a user interface (UI).

Next, the configuration of the controller unit 11 will be described in detail with reference to FIG. 2.

Figure 2:
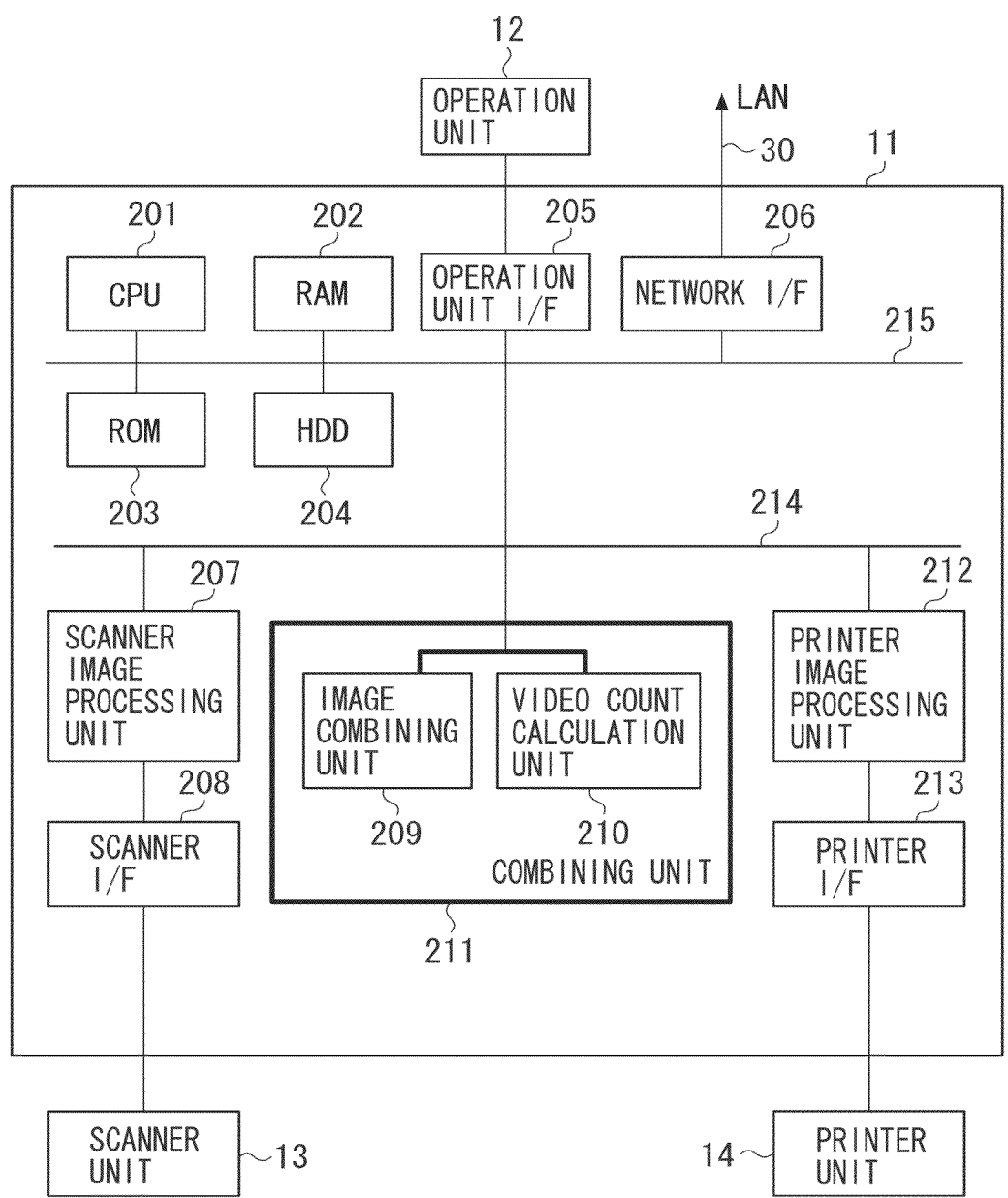
FIG. 2 is a block diagram of a controller unit of an image forming apparatus according to the exemplary embodiment of the present invention.

FIG. 2 is a block diagram of the controller unit 11 of the image forming apparatus 10.

The controller unit 11 is electrically connected to the scanner unit 13 and the printer unit 14. The controller unit 11 is also connected to the PC 20 and other external devices via the LAN 30 and/or a WAN. With such a configuration, the controller unit 11 can input and output image data and device information.

A central processing unit (CPU) 201 controls accesses to/from various types of connected devices in a centralized fashion based on a control program that is stored in a read-only memory (ROM) 203. The CPU 201 also controls in a centralized fashion various types of processing performed inside the controller unit 11. A random access memory (RAM) 202 is a system work memory for the CPU 201 to use for operation. The RAM 202 also functions as a memory for temporarily storing image data. The RAM 202 includes a nonvolatile static random access memory (SRAM) which retains stored contents even after power-off, and a dynamic random access memory (DRAM) from which stored contents are erased after power-off. The ROM 203 contains a boot program of the image forming apparatus 10. A hard disk drive (HDD) 204 can store system software and image data.

An operation unit interface (I/F) 205 is an interface unit for connecting a system bus 215 to the operation unit 12. The operation unit I/F 205 receives image data to be displayed on the operation unit 12 from the system bus 215, and outputs the image data to the operation unit 12. The operation unit I/F 205 also outputs information input from the operation unit 12 to the system bus 215.

A network I/F 206 connects the LAN 30 and the system bus 215 for information input and output.

An image bus 214 is a transmission path for exchanging image data. The image bus 214 is configured as a peripheral component interconnect (PCI) bus or an Institute of Electrical and Electronics Engineers (IEEE) 1394 bus.

A scanner image processing unit 207 corrects, processes, and edits image data that is received from the scanner unit 13 via a scanner I/F 208.

A printer image processing unit 212 receives image data processed by the scanner image processing unit 207 and/or image data received from the PC 20, and applies image processing to the image data. The printer image processing unit 212 outputs the image-processed image data to the printer unit 14 via a printer I/F 213. The processing to be performed by the printer image processing unit 212 will be described in detail below.

A combining unit 211 includes an image combining unit 209 and a video count calculation unit 210. The image combining unit 209 combines two pieces of received image data, such as document image data and copy-forgery-inhibited pattern image data, into a single piece of image data. The video count calculation unit 210 calculates a video count value of image data in which document image data and copy-forgery-inhibited pattern image data are combined. Two pieces of image data can be combined by averaging the luminance values of pixels to be combined and employing the averages as combined luminance values. Another method available is to determine the luminance values of pixels that are brighter in luminance level as the combined luminance values of the pixels. The luminance values of dimmer pixels may be employed as combined luminance values. Pixels to be combined may be subjected to AND operations or exclusive OR operations to determine combined luminance values. All such combining methods are known techniques.

As described above, the video count calculation unit 210 calculates the video count value of an image that is combined by the image combining unit 209. The processing to be performed by the video count calculation unit 210 will be described in detail below.

Next, the processing of the printer image processing unit 212 will be described in detail with reference to FIG. 3.

Figure 3:
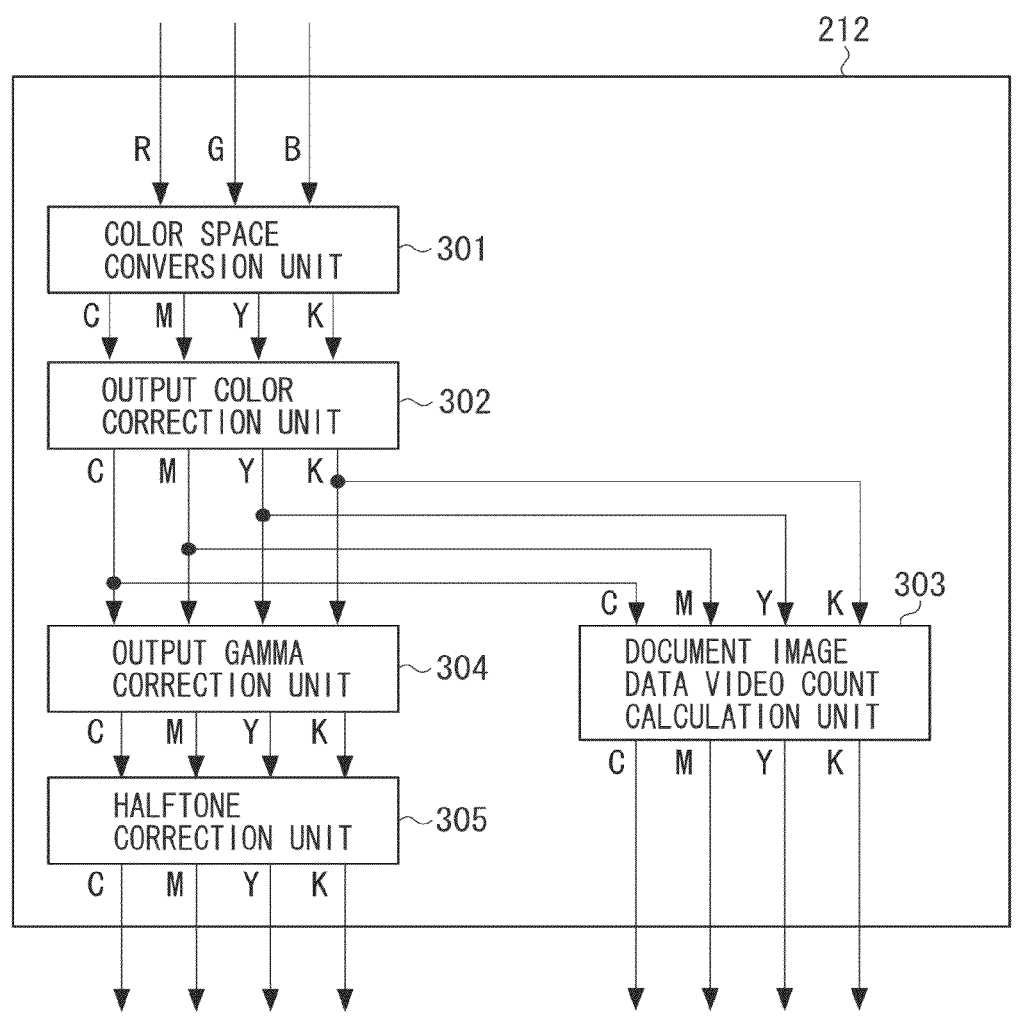
FIG. 3 is a block diagram of a printer image processing unit of the image forming apparatus according to the exemplary embodiment of the present invention.

FIG. 3 is a diagram illustrating the processing procedure of the printer image processing unit 212.

A color space conversion unit 301 converts red-green-blue (RGB) input image data into cyan-magenta-yellow-black (CMYK) image data. An output color correction unit 302 performs output color correction. For example, the output color correction unit 302 converts the CMYK input image data into CMYK image data by using a predetermined conversion table or matrix. A document image data video count calculation unit 303 performs processing of calculating signal values of the CMYK input image data color by color as video count values, and converting the video count values into the amounts of toner consumed. The video count values calculated are transmitted to the RAM 202. An output gamma correction unit 304 performs correction so that the signal values input to the output gamma correction unit 304 and output reflection density values are in proportion to each other. A halftone correction unit 305 performs arbitrary halftone processing according to the number of output gradations of the printer unit 14. For example, the halftone correction unit 305 performs binarization on the received image data (multi-valued image data).

The scanner image processing unit 207 and the printer image processing unit 212 may output received image data without applying the foregoing processing. Such passing of data without the application of processing in a processing unit may be referred to as "skipping the processing unit."

All the foregoing operations are performed by the CPU 201 interpreting and executing the program for controlling the controller unit 11, loaded on the RAM 202. The control state of the program varies depending on inputs from the operation unit 12 and the LAN 30 and the states of the scanner unit 13 and the printer unit 14.

Figure 4:
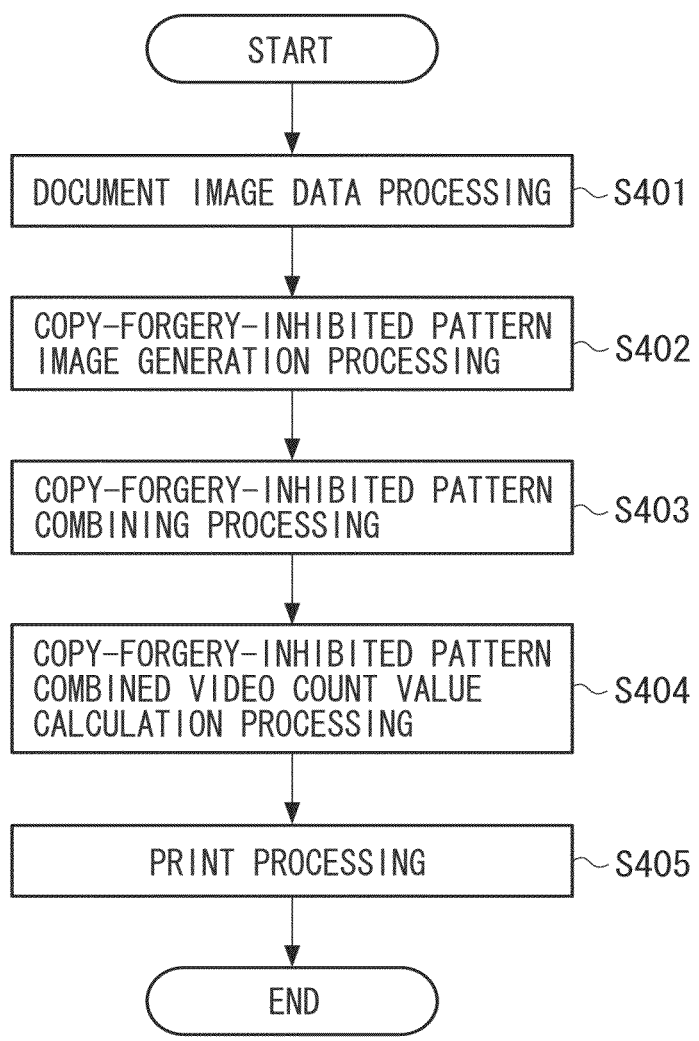
FIG. 4 is a flowchart illustrating processing of combining document image data and copy-forgery-inhibited pattern image data according to the exemplary embodiment of the present invention.

Hereinafter, the processing of combining document image data with copy-forgery-inhibited pattern image data and forming an image on an output sheet will be described with reference to FIG. 4.

In step S401 (document image data processing), the printer image processing unit 212 applies the foregoing processing to document image data.

In step S402 (copy-forgery-inhibited pattern image data generation processing), the CPU 201 stores copy-forgery-inhibited pattern image data into the RAM 202 as uncompressed image data. This copy-forgery-inhibited pattern image data is any one of cyan (C) image data, magenta (M) image data, and black (K) image data.

In step S403 (copy-forgery-inhibited pattern combining processing), the CPU 201 sends document image data stored in the RAM 202 to the image combining unit 209. The CPU 201 also sends the copy-forgery-inhibited pattern image data to the image combining unit 209. The image combining unit 209 combines the two received images by using a known technique as mentioned above.

In step S404 (copy-forgery-inhibited pattern combined video count value calculation processing), the video count calculation unit 210 performs processing of calculating a video count value of the image combined by the image combining unit 209 and converting the video count value into the amount of toner consumed. The processing will be described in detail below.

In step S405 (print processing), the CPU 201 sends the image data combined by the combining unit 211 to the printer unit 14 via the printer I/F 213. The printer unit 14 forms an image of the combined image data on an output sheet.

The foregoing is the image formation processing procedure for forming an image of copy-forgery-inhibited patterned image (combined image) data on an output sheet.

Figure 5:
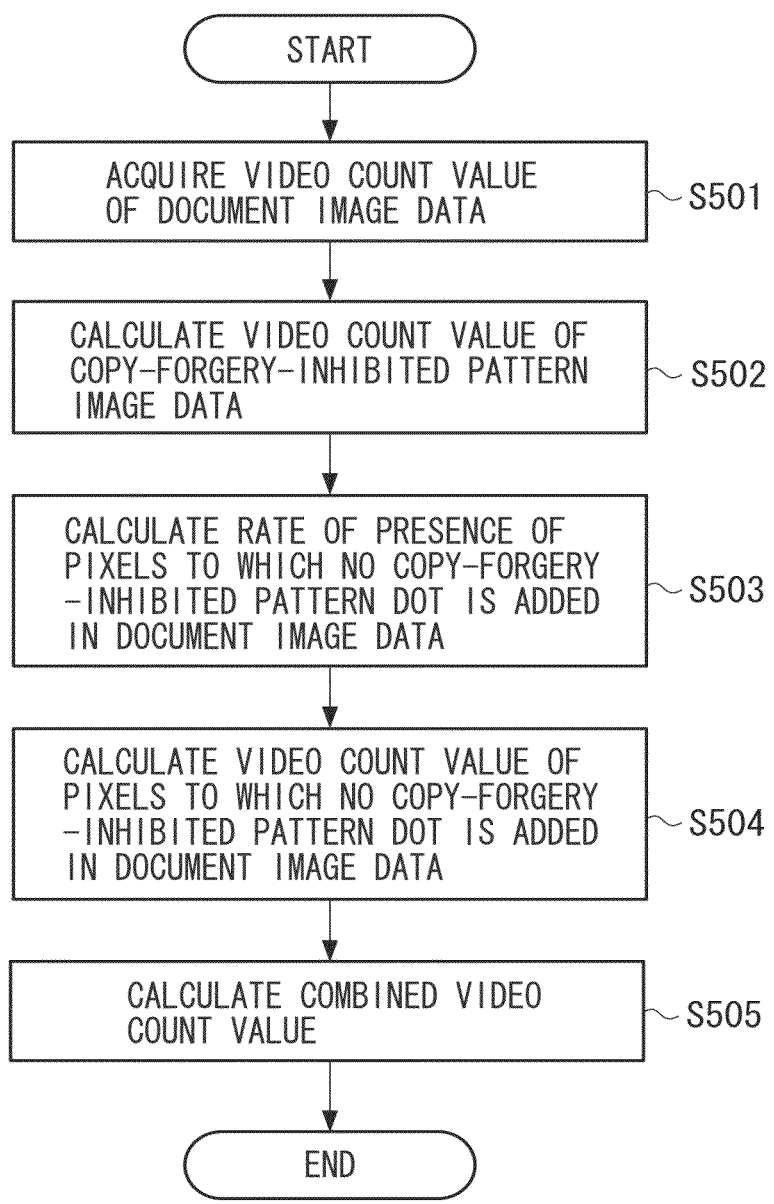
FIG. 5 is a flowchart illustrating processing of calculating a video count value after the combination of document image data and copy-forgery-inhibited pattern image data according to the exemplary embodiment of the present invention.
Figure 7:
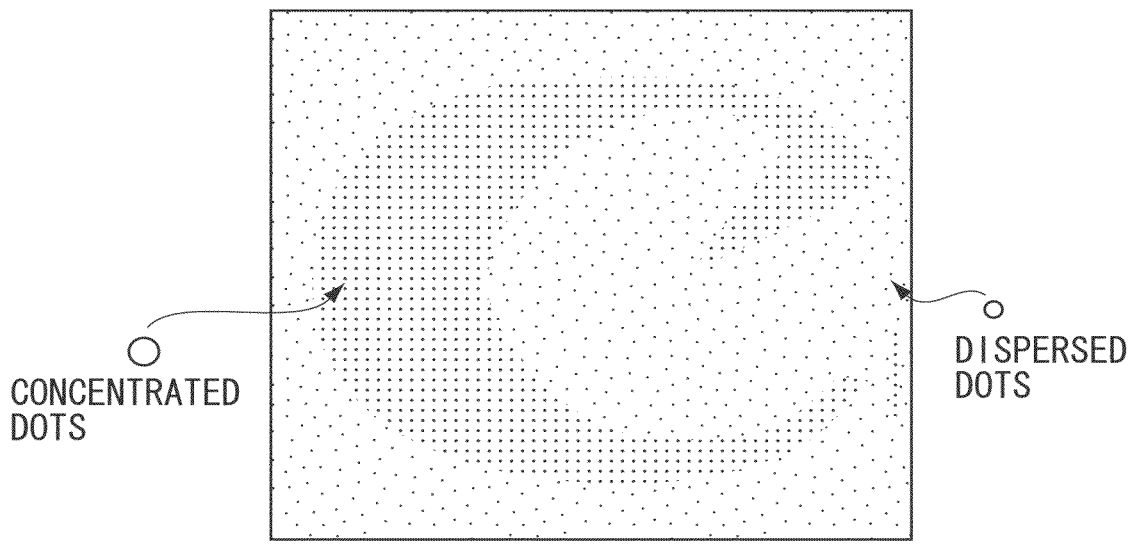
FIG. 7 is a diagram illustrating a state of dots in copy-forgery-inhibited pattern image data.

Now, the copy-forgery-inhibited pattern combined video count value calculation processing will be described with reference to FIGS. 5 and 6.

In step S501 (acquire a video count value of document image data), the video count calculation unit 210 acquires a video count value calculated by the printer image processing unit 212 from the RAM 202. Specifically, the video count value refers to one calculated from image data 601 that is processed by the printer image processing unit 212 and output from the output color correction unit 302.

In step S502 (calculate a video count value of copy-forgery-inhibited pattern image data), the video count calculation unit 210 calculates a video count value of copy-forgery-inhibited pattern image data 602. Specifically, the video count calculation unit 210 calculates the video count value of copy-forgery-inhibited pattern image data 602 that is input to the combining unit 211.

In step S503 (calculate the rate of presence of pixels to which no copy-forgery-inhibited pattern dot is added in the document image data), the video count calculation unit 210 initially calculates the number of copy-forgery-inhibited pattern dots lying in a page of the copy-forgery-inhibited pattern image data 602 that is input to the combining unit 211. Using the calculation of the number of copy-forgery-inhibited pattern dots lying in the page, the video count calculation unit 210 calculates the rate of pixels to which no copy-forgery-inhibited pattern dot is arranged (added) in the document image data 601. Specifically, the rate is expressed by the following expression:

$$1 - \frac{\text{the number of pixels of copy-forgery-inhibited pattern dots in one page}}{\text{the total number of pixels in one page}}$$

In step S504 (calculate a video count value of pixels to which no copy-forgery-inhibited pattern dot is added in document image data), the video count calculation unit 210 calculates a video count value of pixels to which no copy-forgery-inhibited pattern dot is added in the document image data 601. For the calculation, the video count calculation unit 210 uses the rate of presence of pixels to which no copy-forgery-inhibited pattern dot is added in the document image data 601, determined in step S503, and the video count value of the document image data 601 acquired in step S501. Specifically, the calculation is expressed by the following expression:

$$(\text{the video count value of document image data}) * \left(1 - \frac{\text{the number of pixels of copy-forgery-inhibited pattern dots in one page}}{\text{the total number of pixels in one page}}\right)$$

This conceptually determines the video count value of image data 603 in FIG. 6.

In step S505 (calculate a combined video count value), the video count calculation unit 210 determines a combined video count value by adding the video count value of pixels to which no copy-forgery-inhibited pattern dot is added in the document image data 601, determined in step S504, and the video count value of the copy-forgery-inhibited pattern image data 602, calculated in step S502. Specifically, the combined video count value is expressed by the following expression:

$$(\text{the video count value of document image data}) * \left(1 - \frac{\text{the number of pixels of copy-forgery-inhibited pattern dots in one page}}{\text{the total number of pixels in one page}}\right) +$$
$$\text{the video count value of copy-forgery-inhibited pattern image data}$$

This conceptually calculates the video count value of image data 604 in FIG. 6.

The reason why not to calculate the video count value of the document image data 601 from a halftone-processed binarized image is that a binarized image is affected by device's output gamma correction. Being affected by device's output gamma correction means that signal values are converted in consideration of the laser power intensities of latent images under an output gamma value so that the original densities of the document image data 601 coincide with output densities. The video count value of the document image data 601 is thus calculated before the halftone processing.

By the foregoing processing, the video count calculation unit 210 can calculate a video count value of the combined image data into which the document image data 601 and the copy-forgery-inhibited pattern image data 602 are combined.

This can reduce small errors between the developer's consumption system and replenishment system and maintain the mixing ratio of the developer, i.e., toner and a carrier. It is, therefore, possible to output an image with optimum density easily.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-000591 filed Jan. 5, 2011, which is hereby incorporated by reference herein in its entirety.

What is claimed is:

1. A printing apparatus for combining a document image with a copy-forgery-inhibited pattern image to perform printing, the printing apparatus comprising:
    a unit configured to determine a video count value from the document image;
    a unit configured to determine a video count value from the copy-forgery-inhibited pattern image; and
    a unit configured to multiply the video count value determined from the document image by a rate of dots other than dots constituting the copy-forgery-inhibited pattern image in the document image to obtain a product, and to add, to the product, the video count value determined from the copy-forgery-inhibited pattern image to determine a video count value for the printing.

2. The printing apparatus according to claim 1, wherein the document image is a multi-valued image and is binarized before being combined with the copy-forgery-inhibited pattern image.

3. A method of controlling a printing apparatus for combining a document image with a copy-forgery-inhibited pattern image to perform printing, the method comprising:
    determining a video count value from the document image using a video count calculation unit;
    determining a video count value from the copy-forgery-inhibited pattern image;
    multiplying the video count value determined from the document image by a rate of dots other than dots constituting the copy-forgery-inhibited pattern image in the document image data to obtain a product; and
    adding, to the product, the video count value determined from the copy-forgery-inhibited pattern image to determine a video count value for the printing.

4. A non-transitory computer-readable storage medium storing a computer-readable program for causing a computer to perform the method according to claim 3.

* * * * *